United States Patent [19]

Columbus et al.

[11] Patent Number: 6,136,119

[45] Date of Patent: Oct. 24, 2000

[54] METHOD FOR ADHERING TWO SURFACES BY USE OF A POLYISOBUTYLENE ADHESIVE CRAYON

[75] Inventors: Peter Spiros Columbus, Melville, N.Y.; Yogeshbhai Babubhai Patel, Gahanna, Ohio

[73] Assignee: Elmer's Products, Inc., Columbus, Ohio

[21] Appl. No.: 08/225,889

[22] Filed: Apr. 11, 1994

Related U.S. Application Data

[62] Division of application No. 07/855,919, Mar. 23, 1992, Pat. No. 5,331,023.

[51] Int. Cl.[7] .................................................. B29C 65/06
[52] U.S. Cl. ........................ 156/73.5; 156/152; 156/334; 427/11; 524/489
[58] Field of Search ................................ 156/334, 152, 156/73.5; 127/11; 524/489

[56] References Cited

U.S. PATENT DOCUMENTS

| | | | |
|---|---|---|---|
| 2,124,235 | 7/1938 | Mueller-Cunradi et al. | 156/334 |
| 2,142,039 | 12/1938 | Abrams et al. | 106/23 |
| 2,290,393 | 6/1942 | Thomas | 260/28 |
| 2,560,916 | 7/1951 | Barnhart et al. | 260/27 |
| 2,867,596 | 1/1959 | Bennett | 524/487 |
| 2,876,204 | 3/1959 | Schneider et al. | 524/487 |
| 3,030,322 | 4/1962 | Schrader | 524/489 |
| 3,165,283 | 1/1965 | Borisof | 248/205.3 |
| 3,267,052 | 8/1966 | Brennan | 260/5 |
| 3,423,342 | 1/1969 | Kendall | 260/22 |
| 3,471,419 | 10/1969 | Jieplich | 260/2.5 |
| 3,539,481 | 11/1970 | Parker | 260/27 |
| 3,929,694 | 12/1975 | Columbus | 260/17.4 ST |
| 4,066,600 | 1/1978 | Pletcher et al. | 156/332 |
| 4,259,790 | 4/1981 | Borisof | 434/83 |
| 4,273,537 | 6/1981 | Borisof . | |
| 4,361,672 | 11/1982 | Agarwal | 525/54.5 |
| 4,468,254 | 8/1984 | Yokoyama | 106/271 |
| 4,783,354 | 11/1988 | Fagan | 156/152 |

FOREIGN PATENT DOCUMENTS

| | | |
|---|---|---|
| 59-187069 | 10/1984 | Japan . |
| 692945 | 6/1953 | United Kingdom . |

*Primary Examiner*—John J. Gallagher
*Attorney, Agent, or Firm*—Standley & Gilchrist LLP

[57] ABSTRACT

This invention relates to thermoplastic, pressure-sensitive solid adhesives capable of transferring an adhesive film to a substrate by friction rubbing of the adhesive on the substrate. The adhesives of this invention consist essentially of polyisobutylene, wax and optionally an adhesive promoter resin. Said ingredients are within certain proportions, molecular weights, melting points, or hardness values.

18 Claims, 1 Drawing Sheet

METHOD FOR ADHERING TWO SURFACES BY USE OF A POLYISOBUTYLENE ADHESIVE CRAYON

This application is a divisional of our application Ser. No. 07/855,919 which was filed on Mar. 23, 1992 now U.S. Pat. No. 5,331,023.

BACKGROUND OF THE INVENTION

1. Field of the Invention

This invention relates to thermoplastic, pressure-sensitive solid adhesives capable of transferring an adhesive film to a substrate by friction rubbing of the adhesive on the substrate. The adhesives of this invention consist essentially of polyisobutylene (PIB), wax, and optionally an adhesion promoter resin, all within certain proportions, molecular weights, melting points, or hardness.

2. Background Art

Crayon adhesives are well known. Many such adhesives use solvents which normally dry out and require lipstick type containers. Illustrative of such solvent containing crayon adhesives there can be mentioned U.S. Pat. No. 3,929,694 to Peter S. Columbus which issued on Dec. 30, 1975.

U.S. Pat. No. 2,142,039 to A. Abrams et al. of Dec. 27, 1938 discloses a pressure-sensitive composition and sheets coated with such composition. The composition is applied to the sheets by melting the composition and coating the sheets wherein the composition comprises: 15% to 60% of a cohesive agent such as isobutylene polymer, ethyl cellulose or various rubbers; 10% to 50% of an adhesive agent such as rosin; 5% to 45% of a plasticizer such as mineral oil, triphenyl phosphate, etc. and 4% to 45% of a wax modifier such as a microcrystalline wax.

U.S. Pat. No. 2,560,916 to P. Barnhart, et al. of Jul. 17, 1951 relates to a laminating cement composition for plies of paper which comprises: 1 to 25 parts of PIB; 1–30 parts of resin; 95 to 50 parts of microcrystalline wax; and 0 to 20 parts of a plasticizer. It appears that the plies of paper are heat sealed by the cement.

U.S. Pat. No. 3,267,052 to G. Brennan of Aug. 16, 1966 discloses a pressure-sensitive, thermoplastic adhesive which is shaped into a crayon-like body. The adhesive crayon transfers adhesive to paper by rubbing the crayon on paper. The adhesive remains pressure-sensitive for a short period of time during which a second sheet of paper can be adhered to the first by contact with the rubbed-on adhesive. The adhesive comprises: a hard resin, such as those referred to herein as tackifiers and adhesion promoter resins; soft rubber such as plasticized natural rubber, plasticized butyl rubber and PIB having a molecular weight of 1,000 to 25,000; and a soft wax such as Japan wax, ozokerite, paraffin, stearic acid and certain microcrystalline waxes. Additionally, the use of plasticizing oils are described as desirable. This patent also discusses a prior adhesive which contained a low molecular weight polymer of isobutylene and a tacky blend of microcrystalline waxes which produced a weak and temporary bond.

The main differences between the above discussed Brennan patent and the instant invention are: a) Brennan requires soft waxes in his adhesives whereas in the instant invention relatively hard waxes are used. Brennan also uses plasticizing oils and butyl latex to soften the adhesives. b) The PIB and other soft rubbers of Brennan are described as nonsolids of low molecular weight such as from 1,000 to 25,000 and the specific examples as to PIB are at a molecular weight of 10,000. Brennan does not give the method used for determining his molecular weight. The PIB used in the instant invention is a semi-solid and is believed to be of generally higher molecular weight. c) Brennan requires the use of a hard resin for obtaining a permanent bond whereas the instant invention does not require a hard resin and indeed, use of the amount of resin preferred by Brennan, namely, about 52% in applicants' composition provides an unsatisfactory product. d) Brennan requires at least three ingredients in order to obtain a permanent bond in his formulations, whereas only two ingredients are required in the instant invention for a permanent bond. Thus, Brennan describes his adhesives which do not contain the hard resin as mild and temporary adhesives. e) Brennan states that he requires soft waxes to maintain pressure-sensitive properties for a period of time to prevent the applied adhesive film from becoming hard and tackles within a few seconds after application whereas the pressure-sensitive properties of the applied adhesive film of the instant invention are long lasting such as at least half an hour or more. f) The quantity of PIB used in Brennan is from about 1% to 35% whereas the amount used in the instant invention is at least 40%. g) The hard resin (adhesion promoter resin) in Brennan varies from about 15% to 75% of the composition with the preferred amount being about 52% whereas in applicant's invention, the operability of the adhesive promoter resin is within a relatively narrow range at a relative low concentration and when used in quantities of about 52% the crayon adhesive of this invention was inoperable and above 30% the crayon adhesive of this invention has poor properties. h) Hard waxes are optional in Brennan in addition to the soft waxes. Penetration values of such waxes are not given, but many of the waxes listed by Brennan as optional hard waxes are applicant's preferred waxes. i) Brennan uses many waxes of low melting point which have poor stability on storage and shipping during hot weather.

U.S. Pat. No. 3,423,342 to E. Kendall of Jan. 21, 1969 discloses a solid adhesive mass, which is essentially free of surface tack but capable of transfer of an adhesive film to a substrate by friction rubbing of the mass on the substrate. The composition consists essentially of a homogeneous blend of 53–75 parts of a tack promoting rosin derivative, about 10 to 33 parts of a copolymer of ethylene and vinyl acetate, from a small but effective amount for making the mass substantially free of surface tack up to about 5 parts of paraffin wax and a small but effective amount for friction disposition of the film up to about 25% of a plasticizer such as a sebacic acid alkyd.

U.S. Pat. No. 3,471,419 to J. Ehrlich of Oct. 7, 1969 discloses a filled foam product which can be cut in strips and used as a toy. The filling comprises a microcrystalline wax having a needle penetration value of about 15 to 80 compounded with at least one of polyethylene or PIB, a plasticizer for the microcrystalline wax and plasticized polystyrene resin.

U.S. Pat. No. 4,468,254 to N. Yokoyama et al of Aug. 28, 1984 discloses a wax emulsion for waterproofing various materials. The emulsion comprises: water; a hydrocarbon wax; and a liquid polybutadiene, a polybutene or a PIB.

U.K. Patent 692,945 to Industrial Tape Corporation which was published on Oct. 8, 1949 discloses adhesive tapes which are applied by heat and pressure. The tapes are coated with adhesive on one side and a wax or wax together with a wax compatible polymer such as polyethylene or PIB on the other side. However, amoung other shortcommings of this U.K. patent, the quantity of PIB is not greater than 25% of the adhesive.

SUMMARY OF THE INVENTION

The essential ingredients of this adhesive are: from about 40% to 75% by weight of polyisobutylene (PIB) having a molecular weight of from about 40,000 to 70,000; from about 25% to 60% by weight of wax having a melting point of at least 165° F. and a needle penetration value of from about 1 to 15; and 0% to 30% by weight of an adhesion promoter resin, provided, however, that the wax have a needle penetration point of not greater than 8 when at least 10% of adhesion promoter resin is in the adhesive. Preferred ingredients in the adhesive include waxes having needle penetration values of about 1 to 6 and the use of an adhesion promoter resin. The adhesive of this invention can include small quantities of various modifiers and additives.

In one embodiment this invention relates to a solid pressure-sensitive adhesive composition.

In another embodiment the invention relates to a solid adhesive mass.

In still another embodiment the adhesive mass is sized and shaped to be easily handled between the fingers for applying adhesive to a substrate. Such articles can have dimensions which vary over a broad range such as those of from 0.25 to 0.75 inches thick, 0.25 to 1 inch wide and about 1.5 to 4 inches in length and are generally referred to herein as crayon adhesives. Such sized and shaped articles include those shaped as conventional crayons, or geometric shapes such as stars and triangles, small animals, hand held erasers, and the like.

In still another embodiment the invention relates to an adhesive mass containing two essential ingredients.

In a further embodiment the adhesive mass contains three essential ingredients.

In still a further embodiment the invention relates to a method for using the adhesive mass and crayon adhesives of this invention.

Additional embodiments include a method for forming a temporary adhesive bond or a permanent adhesive bond with the same adhesive mass.

Advantages of the adhesives of this invention include the following: 1. Instant adhesive bonding due to the 100% solids content and the absences of solvents. 2. Containers for the adhesive are not required in contrast to water-based adhesive applicator crayons which require lipstick type containers. 3. A single crayon adhesive can provide either a temporary bond between substrates such as paper which permits easy separation of the substrates by pulling them apart without tearing paper or a permanent paper fiber-tearing bond. 4. They can be applied as a clear to translucent and colorless glue-line and the adhesive can be easily colored using relatively low quantities of colorant while the impact of "neon" or fluorescent colorants for the adhesive can be preserved. 5. They do not dry out since it is composed of 100% solids. 6. The adhesive spreads easily under pressure on surfaces without cracking or "stringing". 7. The adhesive is easy to manufacture since it involves no evaporation process when heating and mixing ingredients. 8. The adhesive will not discolor paper on aging; 9. It can be formulated with a minimum number of ingredients. 10. They exhibit worthwhile dimensional stability on storage or shipping at elevated temperatures such as those of 125° F. or 130° F. and preferred compositions have dimentional stability at temperatures such as those of up to 140° F. for one week. 11. It provides instant bonds that do not curl or wrinkle paper, even paper of the thinner varieties.

DETAILED DESCRIPTION OF THE INVENTION

Figure 1:
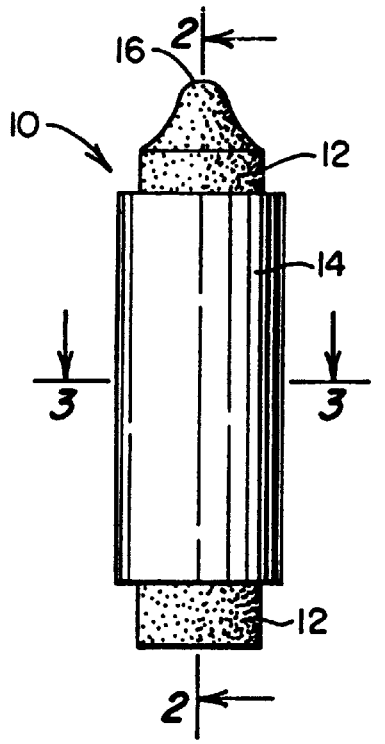
FIG. 1 is a view in elevation of a crayon adhesive in accordance with this invention.

The adhesive of this invention consists essentially of certain PIBs, waxes and optionally adhesive promoter resins. In addition to the above mentioned two or three essential ingredients, small quantities of modifying agents have been found useful in the compositions. Such modifiers include: fillers, coloring agents, antioxidants, fragrances, and the like. The adhesive can simply be an adhesive composition or an adhesive mass. By adhesive mass we mean an adhesive composition which has bulk in contrast to let us say a film. The term adhesive mass includes various shaped articles such as the crayon adhesives mentioned hereinabove.

The wax, polyisobutylene (PIB) and optionally the adhesive promotor resin, are combined in the form of a solid pressure-sensitive, thermoplastic, adhesive mass. This mass is capable of being transferred to a substrate by friction rubbing a point of contact, preferably at a sharp edge, convex area, or the working end of an adhesive mass such as a crayon adhesive sized and shaped as a conventional crayon, as it is drawn across the surface of a firm, dry, material, such as a sheet of paper. The motion of the mass such as a tip end across the contacting material, particularly by the generation of heat, softens the adhesive so that it is spun off or transferred from the contacting point as a continuous adhesive film.

The adhesives of this invention include adhesives which form a temporary bond on pressing a first substrate having the adhesive rubbed thereon against a second substrate. With the temporary bond, the two substrates can easily be pulled apart without transfer of adhesive from the first to the second substrate. A temporary and reusable bond is formed by use of light pressure on the adhesive joint such as by horizontally pressing the thumb or a finger over the area which sandwiches the adhesive between the two substrates. Alternatively, a permanent bond between such substrates and the adhesive can be obtained by the application of greater pressure such as by heavy vertical thumb pressure or pressure developed by rubbing a hard edge over the bound area.

By the term "permanent" bond we mean a bond which tears fibers from paper on being pulled apart. In an attempt to quantify the pressure applied by heavy vertical thumb pressure, applicants' have found that such pressure varies from about 10 to 20 pounds per square inch, such as 15 pounds per square inch, as will be described in the Procedures section below. However, permanent bonds can be formed with some of the adhesives of this invention with less pressure such as that of about 5 to 8 pounds per square inch.

The crayon adhesives of this invention have a noticeable amount of tack and tend to block when in contact with each other. However, they can comfortably be used without a wrapper or other means so as to prevent contact of the fingers with the crayon adhesive. Nevertheless, it is preferable that there be a protective layer on the adhesive mass. Such layer protects the user from the tackiness of the adhesive and keeps the mass from picking up dirt, grime, etc. Where the body of the mass is cylindrical or rod shaped, such mass can be circumferentially enclosed with a sheath of paper, metallic foil, tearable plastic, etc. In such case the wrapping is torn off in the vicinity where the mass is rubbed on the substrate and depleted of adhesive. Paper sheaths should have some degree of adhesive release property with that portion of the paper in direct contact with the adhesive.

It has also been found that a coating of certain waxes on such mass protects against the surface tackiness without impairing its adhesiveness while improving its cosmetic appearance. The wax is applied as a thin film or coating on the adhesive mass such as by melting the wax, and quickly brushing it on to the adhesive at room temperature. Other methods can be used such as by spraying of hot wax on to the adhesive mass. Preferably, the tip end or ends of a crayon adhesive used for transferring adhesive on to the substrate are not coated. The applied wax coating is thin such as that of less than about 5 mils and preferably not more than about 1 mil. The preferred wax coating is that of microcrystalline wax. It is easy to apply such wax by melting and then brushing the molten wax on to the crayon adhesive. Furthermore, the microcrystalline coating does not crack or interfere with the adhesive properties of the crayon adhesive. Attempts to brush polyethylene wax coatings on crayon adhesives were unsuccessful because the wax cooled too fast during the brushing process, generally formed a thick coating, and cracked and crinkled in use. Paraffin wax was not satisfactory because it cracked in use.

The PIB used in this invention has a molecular weight of about 40,000 to 70,000. Preferably, the molecular weight varies from about 45,000 to 65,000 and particularly from about 50,000 to 60,000. This polymer is a tacky, semisolid or gel at room temperature and preferably crystal clear. The quantity of polyisobutylene (PIB) can vary from about 40% to 75% by weight of the adhesive. Preferably the quantity of PIB varies from about 40% to 65% by weight of the adhesive and particularly from about 45% to 60% thereof.

The wax useable in this invention will have a melting point of at least 165° F. such as 165° F. to 250° F. and preferably 190° F. to 240° F. Preferred microcrystalline waxes have melting points of 175° F. to 190° F. Synthetic waxes such as polyethylene waxes, including oxidized polyethylene waxes, preferably have melting points which are about 200° F. to 250° F. Substantial quantities of waxes having melting points of less than 165° F. such as paraffin wax, ceresine wax and bees wax, are not suitable for use in this invention because adhesives containing such waxes have poor storage stability at elevated temperatures such as those of above 125° F. or 130° F. Preferred compositions of this invention such as those which use less than about 70% of wax or which use wax having a melting point of at least 190° F. have stability at 140° F. for one week so as to avoid distortion and melting which can occur on shipping and storage in extreme hot weather conditions.

The hardness, as measured by needle penetration, for the wax or blend of waxes can vary from about 1 to 15. Hardness for the waxes is measured by the needle penetration test ASTM D-1321. Needle penetration values greater than 15 are too soft and when blended with the remaining ingredient or ingredients of the composition do not give smooth and continuous transfer of adhesive upon friction rubbing. Preferred microcrystalline waxes have needle penetration values of about 8 to 15. Preferred synthetic waxes such as polyethylene waxes have needle penetration values of from about 1 to 6. A particularly preferred polyethylene wax has a needle penetration value of from about 1 to 2.5.

Needle penetration values of many waxes can be found in *The CHEMISTRY and TECHNOLOGY of WAXES*, Second Edition (1956) by Albin H. Warth, Reinhold Publishing Corporation, pages 875–877. Also the Warth test defines "soft microcrystalline waxes" as having needle penetration values of 20 to 30. The Warth text also shows the melting point of various waxes on pages 877–880.

A wide variety of waxes can be used in this invention. Illustratively, hydrocarbon waxes eligible for the purpose of the invention include petroleum distillate wax, synthetic wax and naturally-occurring wax having melting points and hardness in the above specified ranges. The petroleum waxes include microcrystalline wax. The synthetic wax used in this invention includes polyolefin wax resulting for homopolymerization or copolymerization of, for example, ethylene and propylene. Thus, the waxes include natural and animal waxes, vegetable waxes, mineral waxes and synthetic waxes. The waxes may be used alone or in combination. Illustrative of specific waxes which can be used in this invention there can be mentioned: microcrystalline waxes, synthetic waxes such as polyethylene waxes, high melting candelilla and rice wax.

Preferred waxes in the adhesives of this invention which do not contain an adhesion promoter resin are microcrystalline waxes and synthetic waxes such as polyethylene waxes. Even among the relatively hard waxes which are used, the harder waxes such as those having a needle penetration value of six or less are preferred. In the case where the composition contains at least 10% by weight of adhesion promoter resin, the wax should have a needle penetration value of no more than eight. Synthetic waxes such as polyethylene waxes are also preferred in cases wherein the adhesive is to provide temporary or repeated bonding since such adhesives have a relatively clean peeling property.

The quantity of wax can vary from about 25% to 60% by weight of the adhesive. When the adhesive does not contain an adhesion promoter resin, the quantity of wax will preferably vary from about 35% to 60% by weight of the adhesive and particularly from about 40% to 55%. A preferred quantity of the wax, when at least 5% by weight of the adhesion promoter resin is present, is about 25% to 45% by weight and particularly from about 25% to 40%. Adhesion promoter resins are also referred to as tackifier resins and are well known materials for enhancing the adhesiveness of adhesive compositions. Thus, the adhesion promoter resin, or simply resin, contributes to the adhesiveness of the composition and in this case facilitates the spreadability of the adhesive when frictionally rubbed on a substrate such as paper.

The adhesive promoter resins useable in this invention are hard at 70° F. (21° C.) and have softening points above 150° F. (65.5° C.). Preferred adhesion promoter resins have softening points of from about 176° F. (80° C.) to 248° F. (120° C.) and particularly from about 194° F. (90° C.) to 230° F. (110° C.). They can be classified as: rosin, modified rosin, and rosin derivatives; hydrocarbon resins; and terpene resins. The hydrocarbon adhesive promoter resins are typically classified by the chemical nature of the feed stream used in their manufacture, e.g. aliphatic resin (C-5) such as those obtained as byproducts in the steam cracking of high naphtha or gas oils; aromatic/aliphatic resins (C-9/C-5); and hydrogenated resins. Illustrative of modified rosins there can be mentioned polymerized rosin; hydrogenated rosin; and disproportionated rosin. Illustrative of rosin esters there can be mentioned pentaerythritol-wood rosin and glycerine-hydrogenated wood rosin. Illustrative of hydrocarbon resins there can be mentioned those of aliphatic petroleum and dicyclopentadiene. Illustrative of polymerized terpene resins there can be mentioned those of polyterpene and beta-pinene. The preferred adhesive promoter resins used in this invention are aliphatic C-5 hydrocarbon resins, polyterpenes, and rosin esters.

The quantity of the adhesive promoter resin, when used, can vary over a wide range such as that of from about 1% to 30% by weight of the adhesive. Preferably, the quantity of adhesion promoter resin varies from about 5% to 25% and particularly from about 10% to 20% by weight of the adhesive.

The essential ingredients of this invention, i.e. PIB, wax and optionally an adhesion promoter resin, will generally comprise at least 90% and preferably at least 95% of the composition with the remainder being conventional modifying agents such as fillers, coloring agents, antioxidants and the like which in the quantity employed do not adversely affect the desirable adhesives properties of the compositions. However, even small quantities of adhesion promoter resin will generally enhance the performance of an adhesive which only contains PIB and wax as the essential ingredients.

The use of inert filler increases the firmness of the composition, the strength of the adhesive bond, and in the case of powdered mica, also adds sparkle to the composition. Illustrative of fillers there can be mentioned: clay, e.g. kaolin, zinc oxide, calcium silicate, calcium carbonate, chalk, whiting, kieselguhr, diatomaceous earth, barium sulphate, talc, soapstone, powdered mica, and mixtures thereof. The quantity of filler can vary up to 5% such as from 0.1% to 5% by weight of the adhesive. Preferably, the filler does not exceed about 3% of the adhesive composition such as from about 0.1% to 3%.

Oxidation inhibitors are generally added to the compositions of this invention and the quantity thereof can vary from about 0.01% to 1.0% or even higher. Illustrative of suitable antioxidants there can be mentioned BHT, namely, butylated hydroxytoluene and BHA, namely, butylated hydroxyanisole.

The preferred adhesives of this invention do not melt or deform at 140° F. and there is no separation or bleeding of the ingredients on storage or shipping when exposed to such temperature for one week.

The adhesives of this invention are generally milky white to translucent or off white unless a colorant has been added to the composition. The adhesive film which is deposited on a substrate by rubbing the composition on to paper or another substrate is preferably colorless to translucent unless a colorant is added. Even with a fluorescent colorant sufficient in quantity to provide a vivid color to the composition, the adhesive film can be generally clear or translucent. Various coloring agents can be used in the adhesives of this invention. Such colorants can be liquids or powders. Particularly preferred colors are the radiant or fluorescent coloring agents such as the fluorescent pigments of the Radiant Color Division, of Magruder Color Co. These are brightly colored fine powders of dyed polymer such as formaldehyde free polyester polyamide. In this regard when the concentration of such pigment in the crayon adhesive is from about 0.05% to 0.3% and preferably from about 0.1 to 0.25 by weight of the adhesive, any coloration of the adhesive joint is not visible through 16 pound yellow ruled paper. Thus, although the coloration of the adhesive mass can be vivid and appealing the color need not be visible through the paper. At concentrations of more than about 0.3%, the colored joint will generally be visible through the paper.

Figure 2:
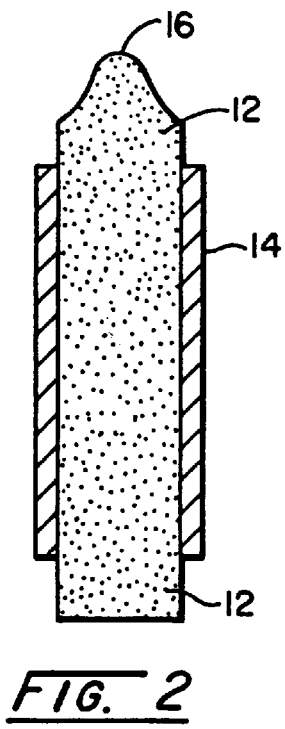
FIG. 2 is a longitudinal section view taken on the line 2—2 of FIG. 1.
Figure 3:
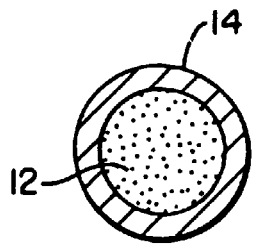
FIG. 3 is a cross sectional view of FIG. 1 taken on the line 3—3 of FIG. 1.

Referring now to the drawings, and particularly to FIG. 1, FIG. 2, and FIG. 3, there is shown a crayon adhesive 10 of this invention which has a cylindrical body 12 and a wrap around covering 14 on its side such as paper, foil, tearable plastic, etc. The crayon adhesive 12 has a pointed tip 16.

Figure 4:
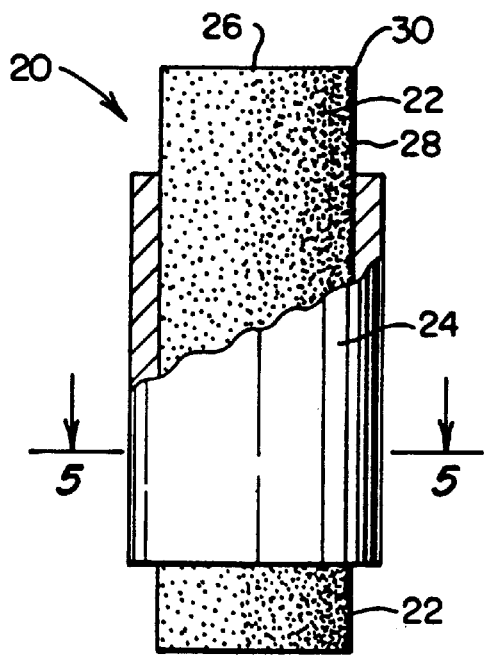
FIG. 4 is an elevation and cut away view of another form of crayon adhesive of this invention.
Figure 5:
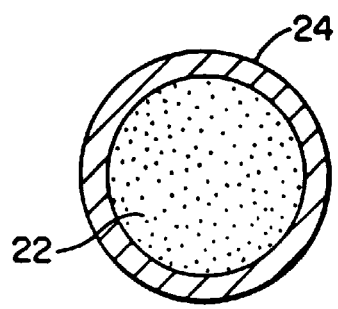
FIG. 5 is a cross section of the crayon adhesive of FIG. 4 taken on the line 5—5.

FIG. 4 and FIG. 5 show another form of crayon adhesive applicator crayon 20 having an adhesive body 22 and a wrap around paper sheath 24. The top of 26 of this cylindrical crayon adhesive is not pointed as in FIG. 1 but instead the intersection of the cylindrical sides 28 of the adhesive and the flat top 26 form a sharp edge 30.

The crayon adhesive may be of any convenient cross-sectional diameter and shape, and may be as thin as one quarter of an inch but for some applications crayons of one inch or more in diameter are satisfactory. Generally, a cylindrical crayon of about three eights to nine sixteenths of an inch in diameter and about two and a half to three inches long is preferred.

In use, the adhesive mass such as the crayon adhesive illustrated above is held by the thumb and fingers and rubbed against a substrate such as paper. Preferably, the portion of the adhesive body rubbing against the substrate is a tip or edge. The rubbing action causes adhesive to transfer on to the substrate. It appears that such rubbing produces heat as can be sensed by placing the back of the hand adjacent to an area of the substrate which has recently received such film by rubbing. The rubbing action can be by substantially straight strokes, swirling notion, etc.

A heavier adhesive film is deposited by swirling as well as by applying greater pressure against the substrate with the mass while it is being rubbed. The thicker film or deposit will provide stronger adhesive properties as compared to a thinner film which is applied lightly. Another substrate is then placed in contact with the adhesive film and the substrates in the area of contact with the film are pressed together to form the adhesive bond. In addition to paper, the adhesives of this invention can bond other substrates such as those of wood, metal and plastics.

In manufacture of the adhesive, care should be exercised so that the melted ingredients are free of air bubbles. A suitable process for large scale manufacture is to first add the wax to a heated vat equipped with agitator, heater and vacuum means. The wax should be melted by heating to about 250° F. to 260° F. for about half an hour to an hour with the agitator turned on. The polyisobutylene is then added in increments at about this temperature. When the blend is homogeneous, the agitator is turned off and foam is permitted to rise by activating the vacuum equipment. The blend is then drawn off from the bottom of the vat to fill cold cavities or molds which have been treated with an adhesive release coating. The adhesive is cooled by itself or by the use of cooling jackets.

In order that those skilled in the art may more fully understand the invention presented herein, the following procedures and examples are set forth. Unless otherwise stated: all parts and percentages in the examples, as well as elsewhere in this application are by weight.

PROCEDURES

The following procedures were used to obtain the data set forth herein unless otherwise indicated.

Procedure A.

Preparation of Adhesive Crayon Test Samples.

The quantity of ingredients were adjusted so that each of the sample crayon adhesives weighed about 8 grams and had a diameter of about half of an inch and were about 2.5 inches long. Adhesion promoter resin, if any is used, and wax is weighed into a clean metal container. If polyethylene wax is used as the wax, a small quantity such as about 0.1 or 0.2 percent of an antioxidant such as BHT (butylated hydroxytoluene) is also added to prevent oxidation of the adhesive promoter resin. A fluorescent color can also be added at this time while stirring the mixture. The PIB is then added in increments with continuous stirring. Aeration should be avoided. Continue heating and stirring until the temperature rises between 280° F. and 300° F. When all the PIB has liquified and the sample is uniform, the composition is poured into a mold which has been coated with a mold release agent such as a silicone. The material is permitted to cool, the mold is separated to yield a solid crayon adhesive.

Procedure B.

Fiber Tearing By Weight Load

A uniform film of adhesive having an area of about one square inch is rapidly rubbed on a sheet of 16 pound 8½×11 yellow basic ruled paper pad from the test crayon adhesive. The adhesive is rubbed on to the face of the sheet intermediate of the sheet edges. This area is immediately covered with another sheet of the same paper and the two sheets pressed together at the adhesive location by means of one of the flat ends of a short weighted cylinder having an area of one fifth of a square inch at each of the flat ends. The adhesive is sandwiched between the two sheets. Weights are then placed on top of the cylinder. The weighted cylinder is left over the adhesive joint for 10 seconds. After 10 seconds the cylinder and weights are removed. The sheets are pulled apart to determine fiber failure of one of the sheets. This entire test is performed at room temperature (about 70° F.). In the case of temporary adhesive bonds, as mentioned previously, the sheets pull apart without tearing any of the paper fibers in contact with the adhesive. In the case of a permanent bond, there is fiber failure of the paper in contact with the adhesive. The percentage of fiber failure is observed. This is measured by visually determining the area of one of the sheets under the cylinder pressure covered by fibers from the other sheet. A 100% fiber failure reading is when fiber is torn from one sheet and transferred over the entire area of the other sheet under the cylinder. A 25% fiber failure means that only about 25% of the area under the cylinder had fibers stuck to it from the other sheet after the sheets are pulled apart. To convert the reading obtained by this test to pounds per square inch, the weight in grams of the cylinder plus that applied to the top of the cylinder is multiplied by 5 and then divided by 454. The cylinder weighed 7 grams and various additional weights were applied such as 1,000 g (grams) or 2,000 g. In the examples, this procedure is simply referred to as Procedure B and the amount of weight on the cylinder is simply reported as the weight placed on the cylinder without taking into consideration the weight of the cylinder itself. Preferred adhesive masses of this invention have at least 30% fiber failure and preferably at least 50% by use of Procedure B with 1,000 g.

Procedure C.

Dimensional Stability at 140° F.

Crayon adhesives to be tested are placed in a clear glass jar and subjected to 140° F. in an oven for 1 week. The unstable samples deform on standing in the jar.

Procedure D.

Needle Penetration Test.

The needle penetration values of waxes were determined by the test method of ASTM D-1321 at 77° F.

Procedure E.

Molecular Weights.

The molecular weights of the PIB are determined by the Flory method. Such method is provided on page 469 of *Food Chemicals Codex,* Third Edition, 1981, which is published by the National Academy Press, Washington, D.C.

Procedure F.

Softening Points.

The softening points of the adhesion promoter resins are determined by the test method of ASTM E-28 unless otherwise specified.

Procedure G.

Melting Point of Wax.

Unless otherwise specified, the melting points of wax are those set forth on pages 877–880 in *The CHEMISTRY and TECHNOLOGY of WAXES,* by A. H. Warth, Second Edition, 1956, Reinhold Publishing Corporation or by the method used for obtaining such melting points on those pages.

TRADEMARKED AND TRADE NAME PRODUCTS

Set forth below is a listing of trademarked and tradename products used in the examples.

(A) POLYISOBUTYLENE 4H, POLYISOBUTYLENE 5H, and POLYISOBUTYLENE 6H. These are polyisobutylene (PIB) products of RIT-CHEM Co. Inc. of Pleasentville, N.Y.

(1) POLYISOBUTYLENE 4H has a typical viscosity average molecular weight of about 40,000 by the Flory method; it is transparent; it has a pour point of 77.5° C. by JIS test method 2269; a penetration index at 25° C. of 168 by JIS K2207 test method, and a viscosity at 200° C. (c.st) of 16,500 by JIS K2283 test method.

(2) POLYISOBUTYLENE 5H has a typical viscosity average molecular weight of about 50,000 by the Flory method; it is transparent; it has a pour point of 97.5° C. by JIS 2269 test method; a penetration index at 25° C. of 139 by JIS K2207 test method; and a viscosity of at 200° C. (c.st) of 30,5000 by JIS K2283 test method.

(3) POLYISOBUTYLENE 6H: has a typical viscosity average molecular weight of 60,000 by the Flory method; it is transparent; it has a pour point of 112.5° C. by the JIS 2269 test method; a penetration index at 25° C. of 121 by JIS K2207 method, and a viscosity at 200° C. (c.at) of 50,000 by the JIS K2283 test method.

(B) VISTANEX LM-MS, LM-MH, and LM-H are PIB products of Exxon Chemical. These PIB's are clear, very viscous, tacky semi-solids. The LM-MS grade has a viscosity average molecular weight of 43,000 to 46,000 (Flory). The LM-MH grade has a viscosity average molecular weight of 51,000 to 56,000 (Flory). The LM-H grade has a viscosity average molecular weight of 58,000 to 68,000 (Flory).

(C) PAXWAX 305, PAXWAX 4682, PAXWAX 9330, PAXWAX 9660, OPH-216 and NWAX PH 100 are waxes of the National Wax Company of Skokie, Ill.

(1) PAXWAX 305 is a microcrystalline wax having a typical drop melt melting point, by ASTM test D-127 of 173° F., a typical needle penetration value at 77° F. by ASTM test D-1321 of 30, and a typical viscosity, SUS at 210° F. by ASTM test D-88 of 85.

(2) PAXWAX 4682 is a microcrystalline wax. Specifications for this wax include: melting point, drop melt of 179° F. by ASTM D-127 method; needle penetration at 77° F. of 12 by ASTM D-1321; and viscosity, sus, at 210° F. of 92 by ASTM D-88; and color by ASTM D-1500 of 0.5.

(3) PAXWAX 9330 has a melting point of, by drop melt ASTM Test D-127 of 190° F. minimum and 195° F. maximum, a needle penetration value at 77° F. by ASTM Test D-1321 of a minimum of 3 and a maximum of 7, and a viscosity sus at 210° F. by ASTM Test D-88 of 80 minimum and 100 maximum.

(4) PAXWAX 9660 is a high melt point microcrystalline wax having a typical drop melt melting point by ASTM Test D-127 of 197° F.; a needle penetration value at 77° F. by ASTM Test D-1321 of 7; and a viscosity, sus, at 210° F. by ASTM Test D-88 of 86.5.

(5) NWAX PH 100 is a synthetic wax (polyethylene wax) with a typical softening melting point by ASTM E-28 of 239.9° F.; a typical needle penetration value at 77° F. by ASTM test D-1321 of 1.5; a typical viscosity, cps, at 300° F. by ASTM D-2336 of 23.9; and a molecular weight by viscometry test method of 700 minimum and 1200 maximum.

(6) NWAX PH-300 is a synthetic wax with a typical drop melt, melting point by ASTM D 127 of 230° F. and a needle penetration value of +3.

(7) OPH-216 is a synthetic wax having a drop melt melting point of 228° F. by ASTM D127 and a needle penetration value at 77° F. (ASTM D1321) of 5.

(D) Adhesion Promoter Resins. POLY-PALE ESTER 10 is the glycerol ester of polymerized rosin and a product of Hercules incorporated of Wilmington, Del. It ha a typical softening point, by the Hercules drop method, of 114° C. and a typical specific gravity at 25/25° C. of 1.08.

(E) Adhesion Promoter Resins. WINGTACK 95 is an adhesion promoter resin. It is a synthetic polyterpene resin with a typical softening point of 95 to 101° C. by the ASTM E-28 test method. It is a product of Goodyear Chemicals Company of Akron, Ohio.

(F) A-C 617 POLYETHYLENE is a polyethylene wax of Allied-Signal Corporation which has a Drop Point, Mettler of 216° F. (102° C.).

(G) Fillers. ASP 200 is an aluminum silicate clay of Engelhard Corporation.

(H) Color pigments. Color pigments such as T1-PK6617 pink, T1-RD 6615 red, T1-CH6610 chartreuse, T1-OG6613 orange, and T1-BL 6619 blue are radiant fluorescent pigments of the Radiant Color division of the Magruder Color Company.

(I) Polybutene. INDOPOL H-1500 is polybutene having a molecular weight by number average vapor phase osmometry of 2060 and an ASTM D 2161 viscosity at 210° F. (99° C.), SUS of 14,900. This is a highly viscous liquid. It is a product of Amoco.

EXAMPLES

The following examples illustrate the invention and many of its advantageous properties. The procedures employed in preparation of the samples and the tests follow the procedures set forth in the above Procedures section, unless otherwise noted.

E1 This crayon adhesive sample contained 53.5% of POLYISOBUTYLENE 6H PIB and 46.5% of PAXWAX 4682 microcrystalline wax. This mass spread in a smooth and continuous manner when rubbed against paper. It had a milky white color, good temporary bond with light horizontal finger pressure and developed a permanent bond with heavy, vertical thumb pressure. The crayon had some tackiness. This sample showed a 60% fiber failure when tested by Procedure B with the use of 1,000 g and 100% when 2,000 g was used. Crayon adhesives having the same composition as this example but containing from about 0.01% to 2% by weight of fluorescent pigment such as T1-CH 6610, T1-GR 6611, and T1-PK 6617 can be used to provide radiant coloration to the crayons. When the concentration of pigment is from about 0.01% to 0.3% and particularly from 0.05% to 0.1% the pigments provide vivid and radiant coloration to the crayons while the coloration does not show through a sheet of 16 pound 8½×11 yellow basic ruled paper.

E2 This crayon adhesive contained 53.5% of POLYISOBUTYLENE 6H PIB, 15% of WINGTACK 95 adhesion promoter resin, 31.3% of NWAX PH 100 synthetic wax; and 0.2% of BHT (butylated hydroxytoluene). This crayon has smooth and easy transfer properties when light horizontal finger pressure is used to bond it. It is easy to spread, it shows a permanent bond with heavy, vertical thumb pressure and has a translucent to white opaque color. It showed a 100% fiber failure when tested by Procedure B with 1,000 g. The use of fluorescent pigments in the manner used in E1 above will give much the same results as those described in E1. WINGTACK 95 is a preferred resin due to its light color.

E3 This crayon adhesive contained 53.5% POLYISOBUTYLENE 6H PIB; 15% of WINGTACK 95 adhesion promoter resin; 31.3% of PAXWAX-4682 microcrystalline wax; and 0.2% of BHT. This sample was unacceptable since it could not be spread. This shows that the use of a wax having a needle penetration value of 12 in a composition containing more than 10% of adhesion prompter resin is unsatisfactory.

E4 This crayon adhesive contained 53.5% of POLYISOBUTYLENE 6H PIB and 46.5% PAXWAX 305 wax. The spreadability of this sample was much harder than that of example E1. This sample failed to show fiber failure by procedure B with the use of 2,000 g although it showed fiber failure by use of heavy vertical thumb pressure. The poor showing of permanent bond is attributed to the softness of the wax, namely a typical needle penetration value of 30 as compared to such penetration value of 12 for the wax used in E1. This crayon had a yellowish color.

E5 This crayon adhesive contained 53.5% of POLYISOBUTYLENE 5H PIB and 46.5% of PAXWAX 4682 microcrystalline wax. This sample had a slightly easier ease of spread, a comparable temporary bond but substantially less permanent fiber failure by the thumb method as compared to sample E1. This sample showed a fiber failure value of 15% when tested by Procedure B and with 1,000 g. This sample had a color comparable to the of example E1.

E6 This crayon adhesive contained 53.5% of POLY-ISOBUTYLENE 4H PIB and 46.5% of PAXWAX 4682 microcrystalline wax. This sample was slightly easier to spread than that of E1 and had a color comparable to that of E1. This sample showed 50% fiber failure by Procedure B with 1,000.

E7 The crayon adhesive contained 44.44% POLYISOBUTYLENE 6H PIB and 55.5% microcrystalline PAXWAX 4682. This sample was slightly easier to spread in relation to that of example E1 but its temporary bond was weaker. Heavy vertical thumb pressure provided only 5% fiber failure. This sample showed 0% fiber failure by Procedure B with 1,000 g and only about 5% or less when 2,000 g was used. This example shows that at 44% PIB the adhesive bond is substantially less than that of using the higher quantity of PIB as in example E1.

E8 This crayon adhesive contained 44.44% of POLYISOBUTYLENE 5H PIB and 55.56 of PAXWAX 4682 wax. It was easier to spread, showed less temporary bond and less permanent adhesion by the finger or thumb pressure method as compared to E1 and had a 30% fiber failure when tested by Procedure B with 1,000 g.

E9 A crayon adhesive having the same composition as that of E7 and E8 but using POLYISOBUTYLENE 4H PIB instead of 6H or 5H showed weaker bonds by the application of heavy vertical thumb pressure than samples E7 or E8. It had a comparable ease of spread and comparable color in comparison with that of example E1.

E10 This crayon adhesive contained 65% of POLYISOBUTYLENE 6H PIB and 35% of PAXWAX 4682. It was slightly harder to spread than that of E1. It was tackier, and its temporary and permanent bond by the use of finger or thumb pressure was strong. Its color was comparable to that of E1 and it had a fiber failure of 50% with 1,000 by Procedure B.

E11 This crayon adhesive had the same composition as that of E10 except that the PIB used was 5H. It was slightly harder to spread, had more tack, a strong temporary bond but less permanent bond by the thumb pressure method. It showed 50% fiber failure by Procedure B with 1,000 g. It had color comparable to that of example E1.

E12 This crayon adhesive contained 25% POLYISOBUTYLENE 6H PIB and 75% MICROWAX 4682 wax. It was easier to spread as compared to that of example E1 and had about the same color. It had less tack and both the temporary and permanent bonds by the use of the fingers or thumb were not as strong as that of example E1. This sample showed no fiber failure with 1,000 g and less than 5% with 2,000 g by Procedure B. This example shows that the use of 25% PIB is insufficient to provide a worthwhile bond.

E13 A crayon adhesive of the same composition as that of example E12 except that the PIB was 5H spread with about the same ease as the crayon adhesive of E12 but the permanent bond was weak as with example E12.

E14 A further crayon adhesive of the same composition as that of examples E12 and E13, but with polyisobutylene 4H instead of 5H or 6H, produced about the same even less permanent bond than the crayon adhesive with the PIB of 5H.

E15 This crayon adhesive contained 53.5% of INDOPOL H 1500 polybutene and 46.5% of PAXWAX 4682 wax. This sample showed no fiber failure by the use of Procedure B with the use of 2,000 g.

E16 This crayon adhesive contained 53.5% of INDOPOL H-1500 polybutene and 46.5% of PH-100 polyethylene wax. This sample showed no fiber failure by the use of Procedure B with the use of 2,000 g. This sample as well as that of E15 show the non-equivalence of the two polymers.

E17 This crayon adhesive contained 53.5% of POLYISOBUTYLENE 6H PIB and 46.5% of AC-617 polyethylene wax. This sample showed 90% fiber failure with 1,000 g and 95% fiber failure with 2,000 g when tested by Procedure B. The color and ease of spread of this sample was comparable to that of example E1.

E18 This crayon adhesive contained 30% POLYISOBUTYLENE 5H PIB and 70% PAXWAX 4682. This sample showed no fiber failure by Procedure B with the use of 2,000 g. This example shows that 30% of PIB is insufficient to develop sufficient strength for a permanent bond in this system. This sample was easier to spread and had comparable color to that of example E1.

E19 This sample contained 53.5% of VISTANEX LM-H PIB and 46.5% of PAXWAX 4682 microcrystalline wax. This sample shows a 40% fiber failure by Procedure B with 1,000 g.

E20 This crayon adhesive contained 53.5% of POLYISOBUTYLENE 6H PIB, 15% WINGTACK 95 resin, 31.3% PH-300 wax, and 0.12% BHT. This sample showed 30% fiber failure by Procedure B with 1,000 g. Although this is a satisfactory formulation, it shows less adhesiveness than example E2 which used a harder wax. The color of this sample was comparable to that of example E1 but it was easier to spread in a smooth and continuous manner. This sample had a 30% fiber failure by Procedure B with 1,000 g.

E21 This crayon adhesive contained 53.5% of POLYISOBUTYLENE 6H PIB, 15% of POLYPALE ESTER resin, 31.5% of NWAX PH 100 wax and 0.1% of stearyl erucimide. Its spreading properties were about the same at those of example E1. This sample showed a 100% fiber failure by use of Procedure B with 1,000 g and had a light tan color.

E22 This crayon adhesive contained 53.5% of POLYISOBUTYLENE 6H PIB 15% of POLYPALE ESTER 10 resin, 31.3% of NWAX PH-100 wax and 0.2% of BHT. This sample was slightly easier to spread than that of example E2. It had a translucent to opaque white color and showed 100% fiber failure with both 1,000 g and 2,000 g by Procedure B.

E23 This crayon adhesive contained 50% VISTANEX LM-H PIB, 15% of WINGTACK 95 resin, and 34.8% of PH-100 wax and 0.2% of BHT. This sample showed 100% fiber failure by Procedure B with 1,000 g. It was slightly easier to spread and had comparable color in relation to that of example E1.

E24 This crayon adhesive contained 53.5% POLYISOBUTYLENE 6H PIB and 46.5% AC-617 wax. This sample showed 90% fiber failure by Procedure B when using 1,000 g. It was slightly harder to spread as compared to example E1. It had a white translucent color.

E25 This crayon adhesive contained 45% of VISTANEX LM-H PIB 15% WINGTACK 95 resin, 39.8% PH-100 wax and 0.2% BHT. It had a translucent to opaque white color. It spread smoothly and continuously on paper and had a 70% fiber failure by Procedure B with 1,000 g.

E26 This crayon adhesive contained 42.92% POLYISOBUTYLENE 4H PIB, 53.65% PAXWAX 4682 WAX 3% ASP 200 clay and 0.43 titanium dioxide. This sample was slightly easier to spread than that of example E1. It developed a slight amount of fiber failure with the heavy thumb pressure method and had a slight grey color. When tested by Procedure B with 1,000 g, it showed less than 5% fiber failure and when tested with 2,000 g it showed 25% fiber failure by Procedure B.

E27 This crayon adhesive contained 35% of POLYISOBUTYLENE 6H PIB, 35% WINGTACK resin, 29.8% NWAX PH 100 polyethylene wax and 0.2% BHT. This sample had less than 5% fiber failure with 1,000 g and about 50% fiber failure with 2,000 g by Procedure B. This is another example showing that resin in quantities above 30% adversely affect the formulation.

E28 This crayon adhesive contained 75% of POLYISOBUTYLENE 4H PIB and 25% of NWAX PH 100 polyethylene wax. This sample had a milky white color, spread smoothly and continuously and had good permanent fiber tearing bond by heavy vertical thumb pressure.

E29 This crayon adhesive contained 53.5% of POLYISOBUTYLENE 6H PIB, 15% WINGTACK 95 resin, 31.3% of oxidized polyethylene wax (OPH-216) and 0.2% BHT. This sample had an ease of spread which was comparable to that of example E1, a light yellow color and showed 40% fiber failure when tested by Procedure B with 1,000 g.

E30 This crayon adhesive was prepared by simply including 0.5% of powdered mica in the formulation of example E2 during its manufacture. This provided a crayon adhesive which had sparkle to it due to the mica. This sample spread smoothly and continuously by rubbing on paper in a manner similar to that of example E2. The mica used is a product of E. M. Industries Incorporated of 5 Skyline Drive, Hawthorne, N.Y. and is the Shimmer Pearl grade of titanium coated mica trademarked AFFLAIR 163. The AFFLAIR 163 mica is that of flat mica platelets coated with titanium dioxide. The platelets have an irregular shape with a thickness of from 0.1 to 3 microns and a length of from 2 to 200 microns. The mica of the Shimmer Pearl grade has lengths of from 40 to 200 microns.

What is claimed is:

1. A method for adhering two surfaces which comprises:
   A. friction rubbing of a thermoplastic, pressure-sensitive adhesive mass on a first surface and deposition of adhesive thereon by such friction rubbing;
   B. placing a second surface in contact with said deposited adhesive and applying pressure on the two surfaces in contact with the adhesive to form a bond wherein the adhesive consists essentially of a mixture of:
      a. about 40% to 75% by weight of polyisobutylene having a Flory molecular weight of from about 40,000 to 70,000;
      b. about 25% to 60% by weight of a wax having a melting point of at least 165° F. and a needle penetration value of from about 1 to 15; and
   C. from 0% to 30% by weight of an adhesion promoter resin for the polyisobutylene and having a softening point above 150° F.; and provided that the wax has a needle penetration value of not greater than 8 when the mass contains at least 10% resin.

2. The method of claim 1 wherein the wax is a wax having a melting point of 190° F. to 240° F. and a needle penetration value of about 1 to 6.

3. The method of claim 1 wherein:
   A. the quantity of polyisobutylene is from 40% to 65% and has a molecular weight of 45,000 to 65,000;
   B. the quantity of wax is from 40% to 55%; and
   C. wherein the polyisobutylene and wax compose at least 95% of said adhesive.

4. The method of claim 1 wherein:
   A the quantity of polyisobutylene is from 40% to 65% and the molecular weight is from about 45,000 to 65,000;
   B the quantity of wax is from 25% to 60%; and
   C the quantity of adhesion promoter resin is from about 5% to 30%.

5. The method of claim 1 wherein the adhesive mass is sized and shaped as a crayon adhesive.

6. The method of claim 4 wherein the adhesion promoter resin is a member selected from the group consisting of an aliphatic C-5 hydrocarbon resin, a rosin ester and a polymerized terpene.

7. A method for adhering two surfaces which comprises:
   A. friction rubbing a thermoplastic, normally tacky, pressure sensitive adhesive mass on a smooth, dry, paperlike first surface to produce frictional heat to soften the adhesive and transfer softened adhesive to the paperlike surface;
   B. placing a second paperlike surface in contact with the transferred adhesive and applying pressure on the two surfaces in contact with the adhesive to form an adhesive bond wherein the adhesive mass consists essentially of a mixture of:
      (a) from about 40% to 75% by weight of polyisobutylene having a Flory molecular weight of 40,000 to 70,000;
      (b) about 25% to 60% by weight of wax having a needle penetration value of from about 1 to 15 and a melting point of at least 165° F.; and
      (c) optionally containing up to about 30% by weight of an adhesion promoter resin for the polyisobutylene wherein said resin has a softening point above 150° F. and is prepared from monomers having at least 5 carbon atoms; and provided that the wax has a needle penetration value of not greater than 8 when at least 10% of adhesion promoter resin is in the composition.

8. The method of claim 7 wherein the adhesion promoter resin is a member selected from the group consisting of rosin, modified rosin, a rosin derivative, a terpene resin, a hydrogenated resin, a resin prepared from a C-5 aliphatic hydrocarbon, and a resin prepared from a mixture of a C-5 aliphatic and a C-9 aromatic hydrocarbon.

9. The method of claim 8 wherein the quantity of adhesion promoter resin is from about 5% to 25% by weight of the adhesive mass.

10. The method of claim 9 wherein the adhesion promoter resin is a member selected from the group consisting of an aliphatic C-5 hydrocarbon resin, a rosin ester, and a polymerized terpene.

11. The method of claim 10 wherein the quantity of polyisobutylene is from about 40% to 65%.

12. The method of claim 8 wherein the wax is a synthetic wax having a needle penetration value of from about 1 to 6.

13. The method of claim 12 wherein the wax is a polyethylene wax.

14. The method of claim 7 wherein the adhesive mass contains from about 40% to 55% of a wax having a melting point of 190° F. to 240° F.

15. The method of claim 7 wherein the adhesive mass contains from about 0.1% to 5% of a filler.

16. A method for adhering two surfaces which comprises:
   A. friction rubbing of a thermoplastic, pressure-sensitive, normally tacky crayon adhesive on a first surface and deposition of adhesive thereon by such friction rubbing;
   B. placing a second surface in contact with said deposited adhesive and applying pressure on the two surfaces in contact with the adhesive to form a bond wherein the adhesive consists essentially of a mixture of:
      a. about 40% to 75% by weight of polyisobutylene having a Flory molecular weight of from about 40,000 to 70,000;
      b. about 25% to 60% by weight of a wax having a melting point of at least 165° F. and a needle penetration value of from about 1 to 6; and
      c. from about 10% to 20% of an adhesion promoter resin for the polyisobutylene, said resin having a softening point of about 176° F. to 248° F. and said resin being a member selected from the group consisting of rosin, modified rosin, a rosin derivative, a terpene resin, a hydrogenated resin, a resin prepared from a C-5 aliphatic hydrocarbon, and a resin prepared from a mixture of a C-5 aliphatic and a C-9 aromatic hydrocarbon.

17. The method of claim 16 wherein the wax is a polyethylene wax.

18. The method of claim 17 wherein the pressure applied to the two surfaces is from about 10 to 20 pounds per square inch and the adhesive bond is permanent.

* * * * *